July 23, 1929.  J. A. DARY  1,722,077
MILK CAN STEAMING DEVICE
Filed March 16, 1925   2 Sheets-Sheet 1
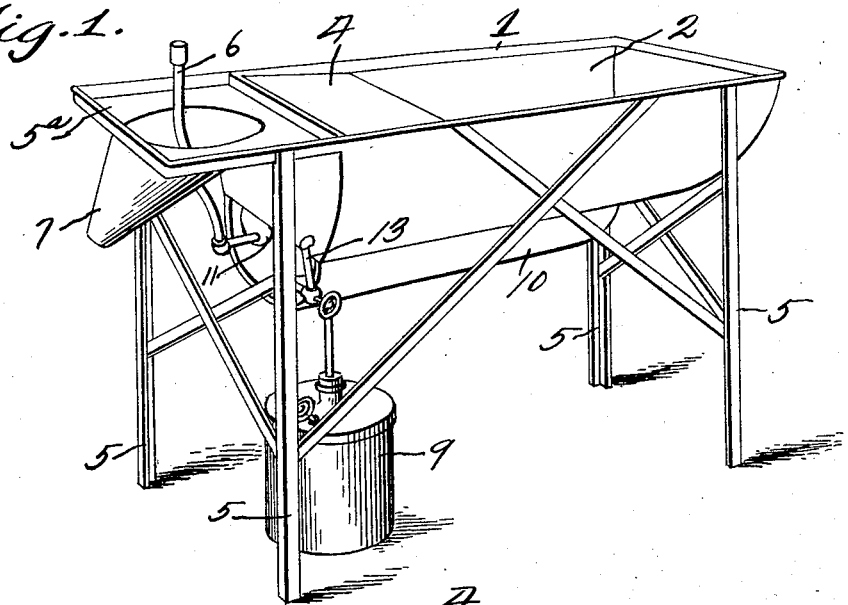
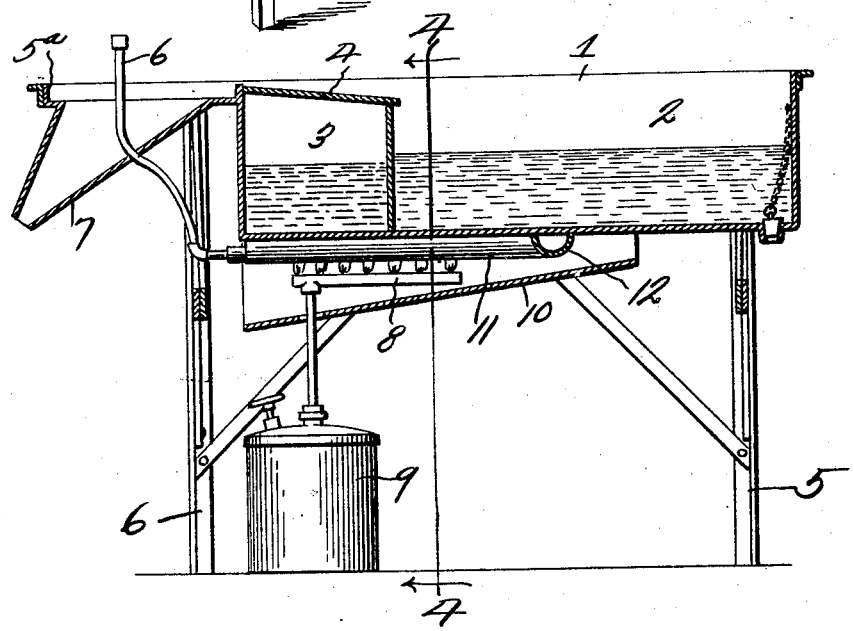
Inventor
J. A. Dary July 23, 1929.                J. A. DARY                 1,722,077
                       MILK CAN STEAMING DEVICE
                       Filed March 16, 1925       2 Sheets-Sheet 2
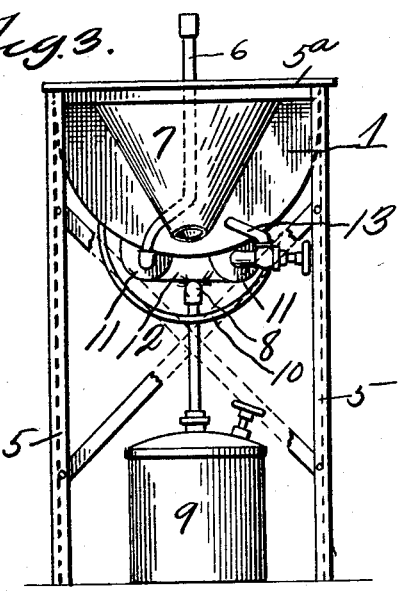
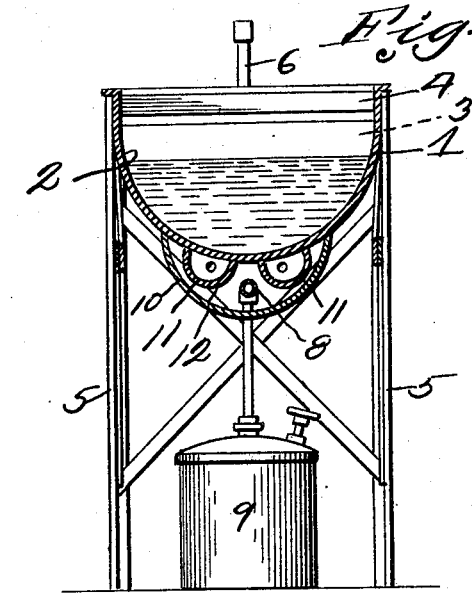
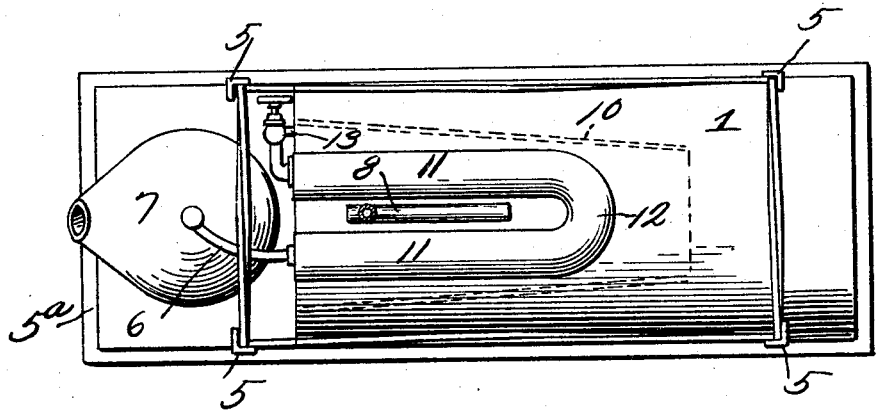
Inventor
J. A. Dary
By D. Swift
                    Attorney Patented July 23, 1929.

1,722,077

UNITED STATES PATENT OFFICE.

JAMES A. DARY, OF OTTAWA, KANSAS, ASSIGNOR, BY MESNE ASSIGNMENTS, TO PEARSON MANUFACTURING COMPANY, A CORPORATION OF MINNESOTA.

MILK-CAN-STEAMING DEVICE.

Application filed March 16, 1925. Serial No. 15,870.

The invention relates to steaming devices for milk cans, and has for its object to provide a device of this character particularly adapted for discharging steam into an inverted milk can for dislodging cream which adheres to the can when milk is dumped therefrom.

A further object is to provide a can steamer comprising a horizontally disposed tank, in which cans, after being steamed, may be washed, an auxiliary tank in one end of the first mentioned tank, and from which water may be discharged in predetermined quantities into a U-shaped steam generator beneath both of the tanks, and from which steam is discharged to a pipe extending upwardly through a can supporting ledge for discharging steam into a milk can in inverted position on the ledge. Also to provide the ledge with a funnel shaped member for discharging the dislodged cream into a container.

A further obect is to heat the U-shaped steam generator and both tanks from a single burner. Also to construct the steam generator in a manner whereby steam will be instantly generated and danger of the device exploding obviated.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the device.

Figure 2 is a vertical longitudinal sectional view through the can steamer.

Figure 3 is a front elevation of the steamer.

Figure 4 is a vertical transverse sectional view taken on line 4—4 of Figure 2.

Figure 5 is a bottom plan view of the steamer showing the casing of the steam generator removed to better show the structure.

Referring to the drawing, the numeral 1 designates a horizontally disposed elongated trough-shaped water-receptacle, which trough is divided into a can washing compartment 2 and a compartment 3 in which clean water is placed, the use of which will be hereinafter set forth. Compartment 3 is normally closed by the hinged cover 4 for preventing foreign matter from getting into the compartment. The trough 1 is supported by means of legs 5 at a height above the floor, which will be convenient for the operator to handle milk cans. Extending outwardly from one end of the trough 1 is a platform ledge 5ᵃ on which milk cans, contents of which has been dumped therefrom, are placed in inverted positions so that the cream which adheres to the wall of the can, when dislodged by steam projected into the can through the steam pipe 6, will flow downwardly through the downwardly and outwardly extending funnel 7 carried by the ledge 5ᵃ to a receptacle disposed beneath the funnel, and after which the can can be washed in the compartment 2.

Disposed below the trough 1, adjacent the bottom thereof is a horizontally disposed burner 8, fuel for which may be supplied from the tank 9, however it is to be understood that fuel for the burner may be obtained from any source desired. Burner 8 is disposed within a casing 10, and between the arms 11 of a hollow core or steam generator 12, which generator is carried by the under side of the tank 1, and is U-shaped. It will be noted that the burner 8 will maintain the water in the compartments 2 and 3 at a relatively high temperature, and the steam generator 12 will be maintained at a relatively high temperature, but at a temperature below the vaporizing degree. Connected to the tank 1 and discharging from the compartment 3 is a pipe 13, which pipe is in turn connected to one of the arms 11 of the steam generator, and through which pipe water is discharged into the generator in any quantity desired for immediately generating steam, which is discharged through the other arm 11 of the generator and the pipe 6 connected thereto, therefore it will be seen that steam is generated only as needed, consequently danger of explosion is obviated, as the pipe 6 is not a closed one, consequently pressure of any considerable degree will not be generated within the generator. By maintaining the water within the compartment 3 at a relatively high temperature by means of the burner 8, it will not be necessary to raise the temperature of the water after it flows into the generator but a few degrees to vaporize the same, consequently the vaporizing operation is practically instantaneous and steam may be generated only as needed. The device is particularly adapted for use in cream buying stations where cream is received from farmers, and at which time the can can be washed after the lodged cream has been dislodged therefrom, sterilized and returned to the farmer.

From the above it will be seen that a steaming device is provided for milk cans which can be easily transported from place to place; water in separate compartments as well as in the steam generator is heated from a single burner and steam instantly generated for steaming and dislodging cream from the wall of a can, and one wherein the can can be thoroughly washed.

The invention having been set forth what is claimed as new and useful is:—

1. A can cleaning and sterilizing apparatus, comprising a water-receptacle, a steam generator positioned beneath the receptacle and having a valve-controlled communication therewith, a heater disposed for heating water in the receptacle and also the water received by the steam generator from the receptacle for generating steam in the generator, a support for a can, and a pipe leading from the steam generator and positioned in relation to the can support to discharge steam into the can.

2. A can cleaning and sterilizing apparatus, comprising a water-receptacle, a steam generator positioned beneath the water receptacle and comprising a water receiving and a steam discharge chamber, a valve controlled communication between the water receptacle and the water chamber of the steam generator, a steam exit pipe leading from the steam chamber of the generator, means for heating water in the receptacle, and also water in the chamber of the generator to generate steam, and a support for a can positioned in relation to the discharge end of the steam exit pipe to have the steam enter the can.

3. A can cleaning and sterilizing apparatus, comprising a water receptacle formed with two water compartments, a steam generator positioned externally of the water receptacle and having a valve controlled communication with one of the compartments of the water receptacle, a heater positioned to heat the water in both compartments of the water receptacle and also in the generator to generate steam in the generator, a support for a can having a funnel extending downwardly from an opening in the can support, and a steam exit pipe leading from the steam generator to the opening in the can support to discharge steam into the can.

4. A can cleaning and sterilizing apparatus, comprising a water receptacle, a steam generator substantially U-shaped in formation, and positioned beneath the water receptacle, a valve controlled pipe communicating the water receptacle with one leg of the generator, a steam-exit pipe leading from the other leg of the generator for discharging steam into a can, and a heater positioned beneath the water receptacle and between the two legs of the generator for heating water in the receptacle and also in the generator to generate steam in the latter.

5. A combination can washer and steamer of the character described, comprising a frame, a trough depending from said frame, legs for the frame, braces between said legs and frame, a partition in said trough and providing a water tank, a steam generator disposed below said trough and tank respectively, means for admitting water to one end of the generator in predetermined quantities, steam conveying means extending and rising from the opposite end of said generator, a platform supported by said frame and having an opening therein through which said last mentioned means projects, and a cone-shaped drain extending at a downward inclination from the lower edges of said opening for the purpose specified.

6. In a can cleaning device, the combination with a water tank and a platform having a steam pipe extending therethrough, of a steam generator comprising a casing, a subtantially U-shaped hollow core arranged in said casing and having one end in communication with the steam pipe, means of communication between said tank and the opposite end of said U-shaped hollow core for supplying water to the latter, a valve for controlling the communication, a stem for controlling said valve, and a heating means for the core and adapted to be disposed below said casing.

In testimony whereof I have signed my name to this specification.

JAMES A. DARY.